Patented Aug. 20, 1935

2,012,069

UNITED STATES PATENT OFFICE 2,012,069

PLASTER COMPOSITIONS AND PROCESSES OF MAKING THE SAME

John E. Meade and Eric W. Nystrom, Warren, Pa., assignors of one-half to Floridin Company, Warren, Pa., a corporation of Delaware No Drawing. Application March 26, 1934, Serial No. 717,426

20 Claims. (Cl. 106—34)

This invention relates to improvements in plaster compositions and in processes of making the same. More particularly it relates to plaster compositions in which spent oil-decolorizing clay (for example, spent fuller's earth) is used with commercial plaster (for example, commercial gypsum neat plaster) in place of all or a part of the sand heretofore commonly used therewith, for the purpose of securing a product of improved quality, and with marked advantages in applying it, as compared with plaster compositions comprising, for example, the heretofore widely used mixture consisting substantially of sand and gypsum neat plaster.

A major object of this invention is to provide an improved plaster composition that will set and dry so rapidly that the particular plastering job can be completed much more quickly than is possible by the use of the materials and methods heretofore generally employed.

Another object of this invention is to provide an improved plaster composition which, even after it has set, still possesses sufficient power to absorb additional moisture (that is, sufficient so-called "station") that the finishing coat will set and dry much more rapidly than heretofore has been possible, due to the fact that the coat of plaster that was applied before the finishing coat is able to absorb additional water from the finishing coat and thus causes that final coat of plaster to harden and dry much more rapidly than heretofore has been possible when the coating or coatings applied prior to the finishing coating consisted of gypsum neat plaster and sand alone.

Other objects of this invention are the obtainment of plaster compositions of lighter weight, more moisture-resisting, able to give more coverage for a given weight of starting raw materials, and which can be applied more easily, more rapidly and with much less loss in handling than any of the building plaster compositions heretofore known to the art such as, for example, building plaster compositions comprising commercial gypsum neat plaster and sand.

Other objects of this invention are the methods or processes of making or manufacturing the hereinafter-described plaster compositions; and a method or process of accelerating the setting and drying of a plastic plaster composition.

Still other objects of the invention will be apparent to those skilled in the art from reading this specification.

In preparing our improved plaster compositions we use spent oil-decolorizing clay (e. g., spent fuller's earth, spent neutralizing clay), preferably spent, granular oil-decolorizing clay, and preferably in place of all or a part of the plastering sand heretofore widely used with, for example, gypsum neat plaster in the preparation of a plastering composition.

By "oil-decolorizing clays" we mean those clays, clay-like minerals or clay-like rocks of porous or cellular structure and of high adsorptive capacity which, either in their raw or natural state or after chemical or other treatment and/or after drying partially, grinding and screening or otherwise separating into particles of the desired size, have such high capacity to decolorize and otherwise purify and improve vegetable and animal oils, fats and waxes (e. g., mineral waxes) and petroleum hydrocarbon oils that they find, in that state and form, wide use for such purposes in industry. By "spent oil-decolorizing clays" we mean oil-decolorizing clays the adsorbing or decolorizing powers of which have been so completely exhausted or spent that they are no longer suitable for use in treating oils, fats, waxes or other substances for the decolorization- or purification-treatment of which new (that is, unused) oil-decolorizing clays such as fuller's earth and the like are commonly employed.

Our definition of fuller's earth, which is a specific type of oil-decolorizing clay, is that given in Bureau of Mines' publication, "Fuller's Earth in 1931" (Mineral Resources of the United States, 1931, Part II, published October 5, 1932). Our definition for "spent fuller's earth" is the same as that hereinbefore given for "spent oil-decolorizing clay" with the exception that the starting material is fuller's earth.

Most of the fuller's earth that is mined at present in the United States is obtained from the States of Florida and Georgia. In these States the earth is found chiefly in Decatur, Twiggs, Baldwin, Houston, Jefferson, Randolph, Screven, Washington, and Wilkinson Counties, Georgia; and in Gadsden, Marion, Manatee and Hernando Counties, Florida. Such fuller's earths all have highly porous or cellular structures; weigh (depending upon the particular deposit and section thereof) from about 28 to about 42 pounds per cubic foot; and are, for the most part, quite similar otherwise in their general physical properties and characteristics. Fuller's earth from this locality is therefore generally designated as Florida fuller's earth. Our definition for "spent Florida fuller's earth" is the same as that hereinbefore given for "spent oil-decolorizing clay" with the exception that the starting material is Florida fuller's earth.

"Neutralizing clays" are another type of oil-decolorizing clay. Classed as such are certain natural clay-like mineral substances which are deficient, although not completely lacking, in their power to decolorize oils, but which have marked affinity for the free mineral acid present in oils that have been treated with sulfuric acid by the petroleum refiner as a step in the process of manufacture, and incidentally decolorize such oils to a limited degree while neutralizing them. Clays of this type are mined in large quantities in Texas. Our definition for "spent neutralizing clay" is the same as that hereinbefore given for "spent oil-decolorizing clay" with the exception that the starting material is neutralizing clay.

"Activated bleaching clays" are still another type of oil-decolorizing clay. Certain earths, such as some bentonites and related clays, having in their natural state little if any power to bleach oils, may be rendered highly active by a chemical treatment (e. g., an acid treatment), which varies in detail with the different earths. Our definition for "spent activated bleaching clay" is the same as that hereinbefore given for "spent oil-decolorizing clay" with the exception that the starting material is activated bleaching clay.

Granular oil-decolorizing clays (e. g., granular fuller's earths) are used by the oil refiner in vertical filters. The first oil to pass through the earth is very light in color, but the oil which follows gradually becomes darker. When the oil coming from the filter is too dark to blend satisfactorily with that previously drawn, the filter inlet is shut off and air pressure is applied to remove most of the excess oil in the filter. Light naphtha is then pumped through the earth to remove the oil and this may be followed by a solvent for the adsorbed coloring matter; or a solvent which will simultaneously remove both the adsorbed oil and the adsorbed coloring matter may be employed. In either case, as a last step, superheated steam is passed through the earth to dry it, after which the earth is suitable for further use in the decolorization of oils. More commonly at present, however, light naphtha is pumped through earth that is no longer suitable for bleaching oil and this is followed by steam. The filter is then dumped, and the earth is revivified (that is, made suitable for re-use) by roasting. Eventually, however, the decolorizing value of the earth is so lessened, whether revivification is by the use of solvents or by roasting, that it is not practical to use the earth further in the treatment of oils. Such earth or clay is said to be "spent" and is then commonly designated as "spent oil-decolorizing clay" or "spent fuller's earth". Similarly, the value of fuller's earth used in other oil-refining processes (e. g., the earth used in towers, for example, Gray towers, in treating petroleum hydrocarbons in the vapor phase) likewise eventually becomes unsuited for further use and is said to be "spent". Spent oil-decolorizing clay heretofore has been discarded by oil refiners as a material possessing no commercial value; and generally its disposal has caused the refiner additional expense. However, we have found this material very suitable for use in making our improved plaster compositions.

In preparing our improved plaster compositions, we use spent oil-decolorizing clay (e. g., spent, granular fuller's earth). We may use, for example, spent fuller's earth from the vapor-phase refining of hydrocarbon oils; or, spent fuller's earth as dumped from oil filters, which earth has been washed with naphtha to remove most of the oil and then treated with superheated steam to dry the earth and to remove most of the naphtha, but which earth still contains (1) a small amount of adsorbed oil (or oil and naphtha), (2) substantially all of the adsorbed coloring matter removed by the earth from the oil that last had been passed therethrough, and (3) carbon resulting from the decomposition of oil and adsorbed coloring matter during numerous prior roasting operations for the purpose of revivifying the earth. The amount of carbon present in spent fuller's earth varies with the particular kind of fuller's earth, the type of furnace or other means used to revivify it, the temperatures and other operating procedures employed when roasting the earth, the number of times the earth has been revivified, and similar influencing factors. The spent earth may contain as little as ½ per cent or, in occasional cases, as high as 15 to 20 per cent of carbon, which is deposited in and on the interior and exterior pores and other surfaces of the earth. Spent fuller's earth is always heavier in weight than new fuller's earth; for example, a sample of new granular Florida fuller's earth weighing about 34 to 36 pounds per cubic foot may weigh in its spent form as much as 42 to 57 pounds per cubic foot.

We may also use spent fuller's earth that has been given a final roasting to remove all volatile matter (moisture, traces of naphtha, adsorbed oil, and adsorbed coloring matter) and to burn out most of or only a small part of the carbon. However, since, so far as we know now, spent earth which has not been so roasted as a final step prior to discarding, is equally as satisfactory as earth that has been so treated, we prefer to use, because of its lesser value, spent earth just as it comes from the filters or after it has been in storage for some time; that is, in the state in which it contains a small amount of adsorbed oil, substantially all of the adsorbed coloring matter removed by the earth from the oil that last had been passed therethrough, and from about ½ per cent to about 20 per cent of carbon produced during numerous prior revivifying operations as aforedescribed and deposited in and on the interior and exterior pores and other surfaces of the earth.

When we use the term "gypsum neat plaster" herein, we refer to material as defined and described by the American Society for Testing Materials in A. S. T. M. Standards, Part II, Non-Metallic Materials, 1930.

Building plaster as commonly made with sand, gypsum neat plaster, and sufficient water to form a mass of the desired working consistency is relatively heavy. This is due, to a large degree, to the fact that the sand itself weighs about 100 pounds per cubic foot. Because of the relatively high weight per cubic foot of the plaster mixture, it is exceedingly tiring to the workman when he applies the mass to the surface being plastered. Such plasters, even when dry and hard, are relatively heavy and add appreciably to the weight of the finished structure, or part thereof, with disadvantages that are self-evident.

Ordinary building plaster mixtures have almost no sound-absorbing properties. Plasters that possess the property of absorbing sound to a substantial degree are commonly known as acoustic plasters. Such plasters are relatively expensive, costing in most cases about three times as much as ordinary plaster. Most often, too, special tools are required for the application of such plasters; and, in the majority of cases, the acoustic plaster is applied under the supervision of an acoustical engineer, who frequently is required to travel long distances at considerable expense to supervise such work, all of which adds greatly to the final cost of the particular plastering job. Some acoustic plasters that can be applied with ordinary plastering tools have been developed, but such plasters likewise cost several times that of ordinary plasters.

A plaster composition containing sand is susceptible to dampness. Dampness causes such a plaster composition to lose its strength and the constituent parts to disintegrate and to separate one from the other. Therefore, it is often necessary either to re-plaster or to re-finish plastered walls that have been detrimentally affected by dampness.

Ready-sanded plasters have a marked tendency to absorb moisture and to harden objectionably when in storage for an appreciable length of time, for example, when stored for from about four to six months or longer, the rapidity with which such plaster compositions absorb water and harden seemingly depending to a large degree upon climatic conditions. It is impossible to use such material when hard, and it therefore must be discarded. It is also inconvenient, and often almost impossible, to use such ready-sanded plasters in rainy or freezing weather, because of these same moisture-absorbing and hardening tendencies. Because of their relatively high cost and the aforementioned objectionable features, ready-sanded plasters are not in as extensive use as otherwise might be possible if these objections were removed.

Although we do not wish to limit ourselves thereto, we prefer, in making a plaster composition suitable for application to lath and other foundation, that the spent earth be of such particle size as to conform to the A. S. T. M. standard specifications for gypsum plastering sand as given on page 113 of the publication, "A. S. T. M. Standards, 1930, Part II, Non-Metallic Materials."

A typical screen test on spent fuller's earth of the particle size we have used successfully in making a plaster composition that is especially suitable for interior plaster work is as follows:

|   | Percent |
|---|---|
| Through No. 14 sieve but retained on No. 20 sieve | 0.3 |
| Through No. 20 sieve but retained on No. 30 sieve | 20.4 |
| Through No. 30 sieve but retained on No. 50 sieve | 52.9 |
| Through No. 50 sieve but retained on No. 100 sieve | 23.5 |
| Through No. 100 sieve | 2.9 |
|   | 100.0 |

Such earth, when new, is known by the trade as 30/60 mesh earth and, when no longer suited for further use in oil refining, is commonly known as spent 30/60 mesh earth. We have also used successfully in making our improved plaster composition what is generally known as spent 16/30 mesh earth, which is somewhat coarser material than spent 30/60 mesh earth. However, depending upon the particular type of plaster composition desired, we may use spent oil-decolorizing clay of any desired particle size (for example, 16/60 mesh, 30/80 mesh, 30/90 mesh, 30/100 mesh, 60/90 mesh, 60/100 mesh, finer than 100 mesh, finer than 200 mesh, or finer than 300 mesh). However, in making a plaster composition that is especially suitable for interior plaster work, we prefer to use spent oil-decolorizing clay of about 16/30 mesh, 30/60 mesh or 16/60 mesh.

The spent granular earth of the preferred particle size is then mixed, either wet or dry, by any suitable means, with gypsum neat plaster until a uniform mixture has been obtained. We may add the dry earth to the dry gypsum neat plaster, or we may reverse this procedure and add the dry gypsum neat plaster to the dry spent earth. In either case, we then mix the two thoroughly together until a uniform mixture has been obtained.

The ratio of spent oil-decolorizing clay (e. g., spent fuller's earth) to gypsum neat plaster that we may employ in our improved plaster composition will vary with the particular spent oil-decolorizing clay and gypsum neat plaster utilized and with the particular characteristics desired in the final product. We may use, for example, from about one-tenth (0.1) part spent fuller's earth to about two (2) parts of a commercial grade of gypsum neat plaster, by weight; or, in other instances, we may use from about two (2) parts of spent fuller's earth to about six-tenths (0.6) part of a commercial grade of gypsum neat plaster, by weight. However, in making an improved plaster composition that is suitable for interior plaster work we prefer to use the spent fuller's earth and the gypsum neat plaster within more narrow limits; that is to say, we prefer to use the spent fuller's earth (e. g., spent, granular fuller's earth) and the neat plaster in the ratio, for example, of from about one (1) part of spent fuller's earth to about two (2) parts of commercial gypsum neat plaster, by weight, to about two (2) parts of spent fuller's earth to about one (1) part of commercial gypsum neat plaster, by weight; thus, we have used very successfully for such plastering work our improved plaster composition comprising approximately equal weights of spent, granular Florida fuller's earth and gypsum neat plaster.

Having obtained a uniform mixture of spent fuller's earth and gypsum plaster, water is added thereto, with constant stirring or mixing, to reduce the mass to the desired consistency for application. The mass is then applied to lath, brick, plaster board or other foundation with ordinary plastering tools and in substantially the same manner as when applying plaster compositions that are made with gypsum neat plaster and sand alone.

Tests have shown that the use of spent fuller's earth in a plaster composition gives a much greater coverage than when ordinary plastering sand is mixed with plaster.

Although our improved plaster composition after setting and drying is relatively light in weight, it is very strong.

We are definitely limited as to the maximum percentage proportion of spent, granular fuller's earth we can use in the preparation of a plaster composition that is especially suitable for interior plaster work. Thus we have found that it is practically impossible to obtain a plaster mixture which, upon the addition of water, can be applied to lath or other foundation satisfactorily, when it comprises more than two (2) parts of spent oil-decolorizing clay (e. g., spent, granular, Florida fuller's earth) to six-tenths (0.6) part of gypsum neat plaster by weight. However, we have been able to use for the purpose stated, a plaster mixture comprising about two parts (2) of spent, granular oil-decolorizing clay to about one (1) part of gypsum neat plaster, by weight; more satisfactory though, for interior plaster work, so far as we know now, is a plaster mixture comprising between about one-half (0.5)

to one and one-half (1.5) parts, by weight, of spent, granular oil-decolorizing clay (e. g., spent, granular, Florida fuller's earth) to about one (1) part of gypsum neat plaster; for example, a plaster composition containing about equal parts by weight of spent, granular, Florida fuller's earth and gypsum neat plaster.

Tests have shown that our improved plaster composition sets and hardens very much more rapidly than the usual plaster mixture comprising sand and gypsum neat plaster. In other words, the presence of spent, granular fuller's earth in a plaster composition, the results indicate, accelerates the setting and drying of a plastic plaster composition.

Other results which we obtain by the use of our improved plaster composition comprising, for example, spent oil-decolorizing clay (for example, spent, granular fuller's earth) and commercial gypsum neat plaster, as compared with the plaster compositions heretofore commonly employed in the art, for example, plaster compositions comprising gypsum neat plaster and sand, are as follows: (1) More rapid setting and drying of a finishing coat is obtained, due to the fact, we believe, that our plaster composition, even after it has set, still possesses sufficient power to absorb additional moisture (that is, sufficient so-called "suction") that, as a result of said power, the finishing coat sets and dries much more rapidly than heretofore has been possible by the use of the usual plaster composition; that is to say, we believe that the more rapid setting and drying of the usual finishing coat which we obtain is probably due to the fact that the coating of our improved plaster composition that we apply before the usual finishing coat is able to absorb additional water from the finishing coat and thus causes said final or finishing coat of plaster to harden and dry much more rapidly than heretofore has been possible when the coating (or coatings) applied prior to the finishing coat consists of, for example, gypsum neat plaster and sand to which water has been added to form a plastic mass. Use of our improved plaster composition for coatings applied prior to the finishing coat does not result in the absorption of water from the finishing coat (by the said initial coating or coatings of our improved plaster composition, when set and partially dry) so rapidly that the finishing coat is difficult to make smooth by trowelling. (2) Our improved plaster composition when in the form of a plastic mass is relatively light in weight, and therefore its application is not so tiring to the workman; when the mass has set and dried, it too is lighter in weight than a similarly dried mass of the usual plaster composition containing sand. (3) Our improved plaster composition when in the form of a hard and dry mass, that is to say, when it has set and dried, is moisture-resisting and therefore disintegrates much more slowly, if at all, in the presence of moisture than does the usual plaster composition that contains sand. (4) Our improved plaster composition can be applied more easily, more rapidly, with less mechanical loss, and at a lesser cost per square yard of surface covered or coated than is possible when applying the usual plaster composition that contains sand as one of its essential constituents.

Our dry mixture of spent oil-decolorizing clay (e. g., spent, granular, Florida fuller's earth) and gypsum neat plaster has been stored for six months and longer without showing any appreciable hardening (due to the absorption of moisture). Our ready-mixed plaster composition, since it does not deteriorate in storage, therefore has marked advantages over the gypsum ready-sanded plasters that are now on the market, which tend to harden when stored. Furthermore, since oil-decolorizing clay (e. g., spent, granular fuller's earth) is normally dry, whereas plastering sand is usually wet, plasterers themselves can dry mix the ingredients of our plaster composition at their convenience, and use it as needed. It is moisture-resisting, and is affected very little, if any, by climatic changes.

Due chiefly to the relatively high porosity, high adsorptive capacity and light weight of spent oil-decolorizing clays, as compared with the usual plastering sands, which are substantially non-porous and weigh about 100 pounds per cubic foot, our improved plaster composition has appreciable sound-absorbing properties; that is to say, the use of spent oil-decolorizing clay (e. g., spent, granular fuller's earth) in our plaster composition gives that composition power to absorb sound greater than that possessed by ordinary sand-plaster mixtures. Our plaster composition therefore has certain value as an "acoustic plaster", and while we do not believe that properly it could be classed as such, we do believe that it could be termed a "semi-acoustical plaster". The sound-absorbing properties of our plaster composition are improved by using more spent, granular oil-decolorizing clay than that which we normally prefer to use in making a plaster composition in which we are not especially interested in its sound-absorbing properties. For the same reasons, our improved plaster composition also has value as an insulating medium. Our plaster composition has greatest value as an acoustic plaster when no hard lime putty plaster is applied as a finishing coat; for, when this is done, it tends to destroy much of the power of our improved plaster composition to absorb sound.

Spent oil-decolorizing clays are not as readily available in all sections of the country as are plastering sands. This means, therefore, that in some regions the cost of transporting the spent oil-decolorizing clay to the particular building construction job may add so greatly to the cost of the spent oil-decolorizing clay as a raw material in making a plaster composition that its use would not be economically attractive to plasterers, despite the numerous advantages possessed by a plaster composition containing spent oil-decolorizing clay in place of sand, as compared with the ordinary sand-plaster mixtures. In such cases, that is, when it is desired to reduce the cost of our improved plaster composition, we may substitute spent, granular oil-decolorizing clay (e. g., spent, granular fuller's earth) for only a part of the plastering sand commonly used with the gypsum neat plaster; for example, instead of using all sand with the gypsum neat plaster, on one locality we may find it economically advantageous to use about 80 per cent sand and about 20 per cent spent, granular fuller's earth; or, as another example, in another locality we may find it economically advantageous to use about 20 per cent sand and about 80 per cent spent, granular fuller's earth. So far as we know now, when spent oil-decolorizing clay is used to replace only a part of the sand commonly used in sand-plaster mixtures, the final product is not so valuable, nor does it possess so high a quality, as a plaster composition comprising spent oil-decolorizing clay and gypsum neat plaster and no substantial amount of sand. However, for economic reasons, it may sometimes be advisable to use a mixture of sand, spent oil-decolorizing clay and gypsum neat plaster, and such a mixture is deemed by us to be within the scope of our invention.

Our invention is not limited to the use of spent oil-decolorizing clay as a substitute for all or a part of the sand heretofore commonly used with gypsum neat plaster in making a plaster composition, since we contemplate the use of spent oil-decolorizing clay, either alone or together with sand, and various other types of commercial plaster or plasters (e. g., lime plaster, Keene's cement, gypsum wood-fibered plaster, gypsum molding plaster, gypsum pottery plaster), and with or without the addition of other constituents, in the preparation of plaster compositions having commercial utility. It is intended to be understood that the terms "plaster," "plastering," and "plaster compositions," as used herein, refer to a material of construction and to a process of using such material, and not in the sense of a substance that is used in medicine for the treatment of human ailments by the external application of the substance.

In accordance with the provisions of the patent statutes, we have hereinbefore described the best mode or modes now known to us of carrying this invention into effect; but we desire it to be distinctly understood that we fully realize that changes may be made therein and that we intend to include within the scope of the claims that follow hereinafter all modifications that do not depart substantially from the spirit of the invention set forth therein and thereby.

What we claim is:

1. A dry mix composition that, upon the addition of sufficient water, forms a plastic mortar and that consists of commercial plaster and spent oil-decolorizing clay.

2. A dry mix composition that, upon the addition of sufficient water, forms a plastic mortar capable of application with ordinary plastering tools to brick, lath and other foundation and which sets to form an improved plaster surface, and that consists of gypsum neat plaster and spent, granular fuller's earth.

3. A plastic composition that is capable of forming a hardened mass when set and dry, and that consists of a mixture of commercial plaster, spent oil-decolorizing clay and water.

4. A plastic composition that is capable of forming a hardened mass when set and dry, and that consists of a mixture of spent fuller's earth, commercial plaster and water.

5. A plastic composition that is capable of forming a hardened mass when set and dry, and that consists of a mixture of spent oil-decolorizing clay, gypsum neat plaster and water.

6. A plastic composition that is capable of forming a hardened mass when set and dry, and that consists of a mixture of spent fuller's earth, gypsum neat plaster and water.

7. A plastic composition that is capable of application with ordinary plastering tools to brick, lath and other foundation, that sets to form an improved plaster surface, and that consists of a mixture of spent, granular fuller's earth, gypsum neat plaster and water.

8. A plastic composition that is capable of forming a hardened mass when set and dry, and that consists of a mixture of spent, granular fuller's earth, plastering sand, gypsum neat plaster and water.

9. A hard, water-resisting, plaster composition resulting from the setting and drying of a plastic composition that consists of a mixture of spent oil-decolorizing clay, commercial plaster and water.

10. A hard, water-resisting, plaster composition resulting from the setting and drying of a plastic composition that consists of a mixture of spent oil-decolorizing clay, gypsum neat plaster and water.

11. A hard, water-resisting, plaster composition resulting from the setting and drying of a plastic composition that consists of a mixture of spent fuller's earth, gypsum neat plaster and water.

12. A hard plaster composition resulting from the setting and drying of a plastic composition that consists of a mixture of spent fuller's earth, plastering sand, gypsum neat plaster and water.

13. A hard, water-resisting, semi-acoustical, plaster composition, resulting from the setting and drying of a plastic composition that consists of a mixture of spent, granular fuller's earth, gypsum neat plaster and water.

14. The process of manufacturing a plastic plaster composition possessing characteristics as herein set forth, which consists in mixing in a dry state commercial plaster and spent oil-decolorizing clay, and adding water to the mixture in a quantity sufficient for the obtainment of a mass of the desired plasticity.

15. The process of manufacturing a plastic plaster composition possessing characteristics as herein set forth, which consists in mixing in a dry state gypsum neat plaster and spent oil-decolorizing clay, and adding water to the mixture in a quantity sufficient for the obtainment of a mass of the desired plasticity.

16. The process of manufacturing a plastic plaster composition that sets and dries rapidly after having been shaped to the desired form, which consists in mixing in a dry state gypsum neat plaster and spent, granular oil-decolorizing clay, and adding water to the mixture in a quantity sufficient for the obtainment of a mass of the desired plasticity.

17. The step in a process of manufacturing a plastic plaster composition that is capable of application with ordinary plastering tools to brick, lath, and other foundation and that sets and dries rapidly to form an improved plaster surface possessing characteristics as herein set forth, which consists in mixing in a dry state gypsum neat plaster and spent, granular fuller's earth.

18. The process of accelerating the setting and drying of a plastic plaster composition which consists in mixing with the dry, starting plaster a quantity of spent oil-decolorizing clay.

19. The process of accelerating the setting and drying of a plastic plaster composition, which consists in mixing with the dry, starting plaster a definite proportion of spent, granular fuller's earth.

20. The process of accelerating the setting and drying of a plastic composition composed of gypsum neat plaster, an aggregate and water, which consists in substituting for a part of the sand, heretofore commonly used as the sole aggregate in such a plastic composition, a quantity of spent, granular fuller's earth.

JOHN E. MEADE.
ERIC W. NYSTROM.

CERTIFICATE OF CORRECTION.

Patent No. 2,012,069. August 20, 1935.

JOHN E. MEADE, ET AL.

It is hereby certified that error appears in the printed specification of the above numbered patent requiring correction as follows: Page 1, first column, line 25, for "station" read suction; page 4, first column, line 44, for "meat" read neat; and that the said Letters Patent should be read with these corrections therein that the same may conform to the record of the case in the Patent Office.

Signed and sealed this 3rd day of March, A. D. 1936.

Leslie Frazer
Acting Commissioner of Patents.

(Seal)